United States Patent
Horie et al.

(10) Patent No.: US 6,589,127 B1
(45) Date of Patent: Jul. 8, 2003

(54) SILENT CHAIN WITH ROCKER JOINT PINS

(75) Inventors: Hiroshi Horie, Osaka (JP); Kazumasa Matsuno, Osaka (JP); Masao Maruyama, Osaka (JP); Shigekazu Fukuda, Osaka (JP); Yoshinori Iwasaki, Osaka (JP); Takayuki Funamoto, Osaka (JP); Hitoshi Ohara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 4 days.

(21) Appl. No.: 09/711,624

(22) Filed: Nov. 13, 2000

(30) Foreign Application Priority Data

Nov. 12, 1999 (JP) ............................................. 11-322490

(51) Int. Cl.$^7$ ............................................... F16G 13/04
(52) U.S. Cl. ......................... 474/215; 474/212; 474/214
(58) Field of Search ................................ 474/211, 212, 474/214, 215, 216, 217

(56) References Cited

U.S. PATENT DOCUMENTS

| | | | | |
|---|---|---|---|---|
| 1,743,500 A | * | 1/1930 | Sturtevant | 474/214 |
| 2,096,061 A | * | 10/1937 | Perry | 474/215 |
| 5,651,746 A | * | 7/1997 | Okuda | 474/215 |
| 6,260,345 B1 | * | 7/2001 | Kanehira et al. | 59/4 |
| 6,277,046 B1 | * | 8/2001 | Ohara et al. | 474/217 |

* cited by examiner

Primary Examiner—Thomas R. Hannon
Assistant Examiner—Vicky A Johnson
(74) Attorney, Agent, or Firm—Howson and Howson

(57) ABSTRACT

A silent chain includes guide link rows and joint link rows arranged alternately and articulately connected in an endless fashion by rocker joint pins each composed of a longer pin and a shorter pin. In each guide link row, the longer pin is fitted with two guide plates and also inserted through link plates disposed between the guide plates. In each joint link row, the shorter pin is inserted through link plates. The longer pin and the shorter pin are initially formed in a straight configuration and have the same cross-sectional shape. When the silent chain is stretched substantially straight after having been subjected to a proof load, the pitch of the guide plates is made slightly greater than the pitch of adjacent contact points between the longer pins and the shorter pins of the rocker joint pins in the guide link rows so that the longer pins are elastically deformed into a bow-like configuration bent toward the mating shorter pins. The rocker joint pins having the elastically deformed longer pins acquire spring or cushioning properties which are effective to improve the strength of the chain and reduce the operation noise of the silent chain.

3 Claims, 3 Drawing Sheets

SILENT CHAIN WITH ROCKER JOINT PINS

BACKGROUND OF THE INVENTION

The present invention relates generally to a silent chain, and more particularly to a so-called "rocker joint" type silent chain having a large number of link plates interleaved and articulately connected by rocker joint pins.

Rocker joint type silent chains are known in which the pitch of guide plates and the pitch of link plates are made equal to each other for the purpose of distributing the loads evenly over the link plates arranged in the widthwise direction of the chain to thereby lengthen the service life of the chain.

According to one conventionally proposed improvement, the pitch of the guide plates is initially made smaller than the pitch of the link plates, and by appropriately changing the shape, thickness, material or hardness of the guide plates, the guide plates are made susceptible to plastic deformation when subjected to a proof load. Thus, after the proof load is applied to the guide plates, the pitch of the guide plates becomes substantially equal to the pitch of the link plates.

In another conventionally proposed improvement, the pitch of the guide plates is initially made greater than the pitch of the link plates, and the pitch of the link plates is enlarged when a proof load is applied to the link plates to such an extent that the pitch of the link plates and the pitch of the guide plates are substantially equal to each other.

According to still another conventionally proposed improvement, a longer pin and a shorter pin initially formed in a bent or curved configuration are used in combination so that when the silent chain is subjected to a tensile force, the bent pins perform a spring action effective to reduce the noise and wear of the silent chain.

When a silent chain is actually used in an automobile engine or an automobile transmission, a tensile force acting on the silent chain also acts on the guide plates. Accordingly, the conventional silent chains according to the first and second improvements described above are likely to deteriorate in durability and have a shortened service life because the guide plates are reduced in strength and hence likely to be broken due to plastic deformation caused when the proof load is applied to equalize the pitches of the guide plates and link plates before the actual use of the silent chain.

The silent chain according to the third conventional improvement described above also encounters a difficulty that, since the bent longer pin used in combination with the shorter pin forms a space at each end of the rocker joint pin, the rocker joint pin cannot be easily inserted through the inner link plates and thus lowers the assembling efficiency of the silent chain. In order to achieve the desired assembling efficiency, an attempt may be made to enlarge pin holes formed in the link plates. However, the attempted enlargement of the pin holes will result in a reduction of the strength of the link plates.

SUMMARY OF THE INVENTION

It is accordingly an object of the present invention to provide a rocker joint type silent chain including structural features which are capable of increasing the strength of guide plates and link plates and also reducing the operation noise of the silent chain.

According to the present invention, there is provided a silent chain comprising: guide link rows each having a pair of guide plates and at least one link plate disposed between the guide plates; joint link rows each having link plates numbering one more than the number of the link plates in each of the guide link rows; and rocker joint pins connecting the guide link rows and the joint link rows alternately in an endless fashion. Each of the rocker joint pins is composed of a longer pin and a shorter pin having a length smaller than the length of the longer pin. The longer pin is fitted in each of a pair of pin holes formed in each of the guide plates and also is inserted through each of a pair of pin holes formed in each of the link plates, and the shorter pin is inserted through each of the pair of pin holes formed in each link plate. The longer pin and the shorter pin are initially formed in a straight configuration and have respective rocker surfaces in contact with each other. When the silent chain is stretched substantially straight after having been subjected to a proof load, the pitch of the guide plates is 0.2% to 0.7% greater than the pitch of adjacent contact points between the longer pins and the shorter pins of the rocker joint pins in the guide link rows so that the longer pins, which were initially formed in the straight configuration, are elastically deformed into a bow-like configuration bent toward the mating shorter pins.

The term "proof load" is used herein to refer to a predetermined load applied to a silent chain after assembly so as to remove an initial elongation caused due to plastic deformation such as burrs and assembling distortion that are unavoidable for the guide plates and link plates.

After application of the proof load, the silent chain is stretched substantially straight. In this condition, the pitch of the guide plates is made slightly greater than the pitch of the link plates so that the longer pins initially formed in a straight configuration are elastically deformed into a bow-like configuration bent toward the mating short pins. With the longer pins thus deformed elastically, the rocker joint pins, and hence the silent chain, as a whole, acquire spring properties.

When the silent chain is used in an automobile engine or an automobile transmission, the guide plates are pre-loaded by a compressive force exerted from the elastically deformed longer pins. Accordingly, when the chain tension is small, the chain tension is exclusively borne by the link plates. As the chain tension increases, the link plates undergo elastic deformation in the longitudinal direction of the chain, which gradually lessens the compressive force of the longer pins. Subsequently, the pitch of the guide plates becomes substantially equal to the pitch of the link plates whereupon the guide plates start to bear the chain tension.

By thus applying a compressive pre-load to the guide plates, and by setting the difference in pitch between the guide plates and the link plates to be not greater than the amount of elastic deformation of the link plates in the longitudinal direction of the silent chain, it is possible to change the magnitude and direction of loads on the guide plates according to the chain tension. When the chain tension is small, the link plates bear the chain tension. Conversely when the chain tension is large, the guide plates bear the chain tension in cooperation with the link plates.

The pitch difference is preferably in the range of 0.2 to 0.7% of the pitch of the link plates. If the pitch difference is less than 0.2%, it is difficult to bend the longer pin arcuately toward the mating shorter pin due to cumulative tolerances of the parts (i.e., the guide plates, link plates and rocker joint pins). Thus, the rocker joint pins do not acquire spring properties and, hence, they are unable to exert a compressive pre-load onto the guide plates. If the pitch difference exceeds 0.7%, the longer pins are bent into an excessively large curvature, tending to cause a breakage of the longer pins as well as excessively large compressive pre-loading of the guide plates.

BRIEF DESCRIPTION OF THE DRAWINGS

A preferred embodiment of the present invention will now be described in detail, by way of example only, with reference to the accompanying drawings, in which.

DETAILED DESCRIPTION OF THE INVENTION

The following description is merely exemplary in nature and is in no way intended to limit the invention or its application or uses.

Figure 1:
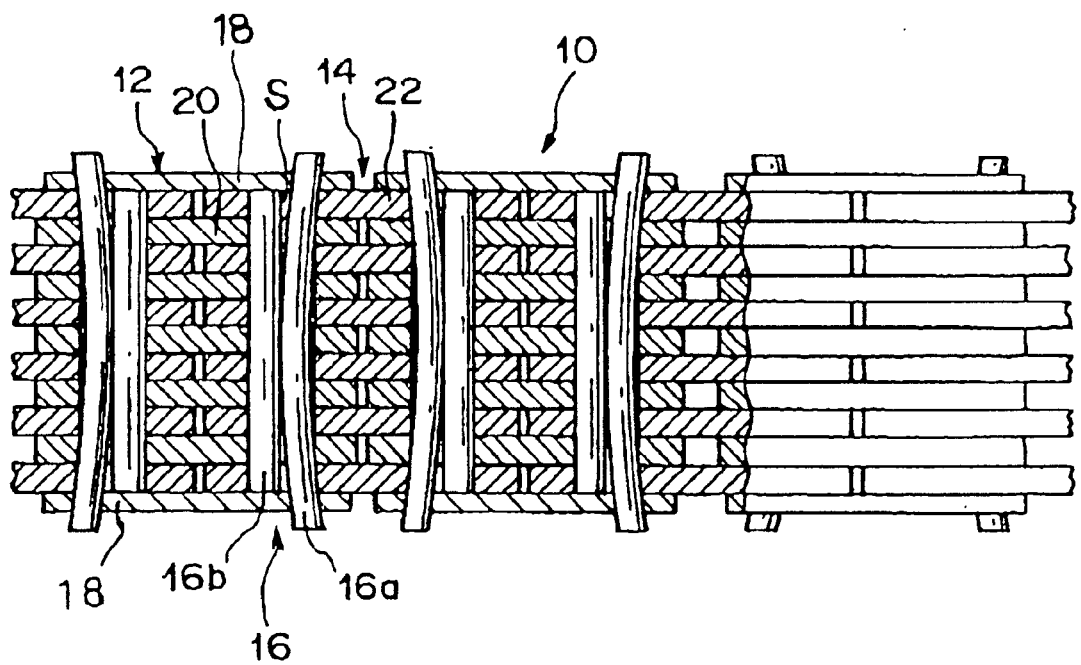
FIG. 1 is a fragmentary plan view, partly in cross section, of a silent chain according to an embodiment of the present invention.
Figure 2:
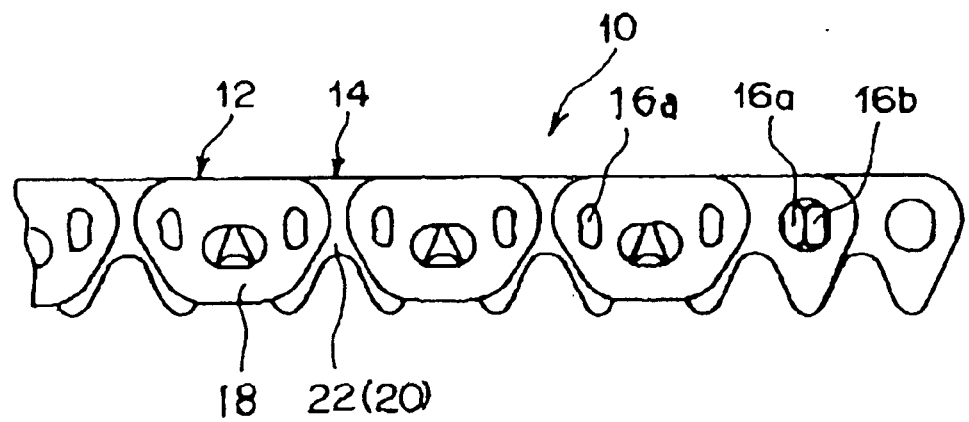
FIG. 2 is a front elevational view of the silent chain.

Referring now to the drawings and FIGS. 1 and 2 in particular, there is shown a rocker joint type silent chain 10 embodying the present invention. The silent chain 10 includes guide link rows 12 and joint link rows 14 arranged alternately and articulately connected in an endless fashion by means of rocker joint pins 16. The guide link rows 12 each have a pair of guide plates 18 and at least one link plate 20. The joint link rows 14 each have link plates 22 numbering one more than the number of the link plates 20 in each of the guide link rows 12. In the illustrated embodiment, each guide link row 12 has five link plates 20, and each joint link row 14 has six link plates 22.

The link plates 20 in the guide link rows 12 and the link plates 22 in the joint link rows 14 are identical in shape. The thickness of the link plates 20 may be different from the thickness of the link plates 22.

The rocker joint pins 16 are each composed of a pair of pins 16a, 16b of different lengths. The longer pin 16a is fitted with the pair of guide plates 18 in each guide link row 12 and is also inserted through the link plates 20, 22 in each pair of adjacent guide and joint link rows 12, 14 interleaved with each other. The shorter pin 16b is inserted through the link plates 20, 22 in each pair of adjacent guide and joint link rows 12, 14 interleaved with each other. The longer pin 16a and the shorter pin 16b thus assembled with the guide plates 18 and link plates 20, 22 have respective rocker surfaces contacting with each other.

Figure 3:
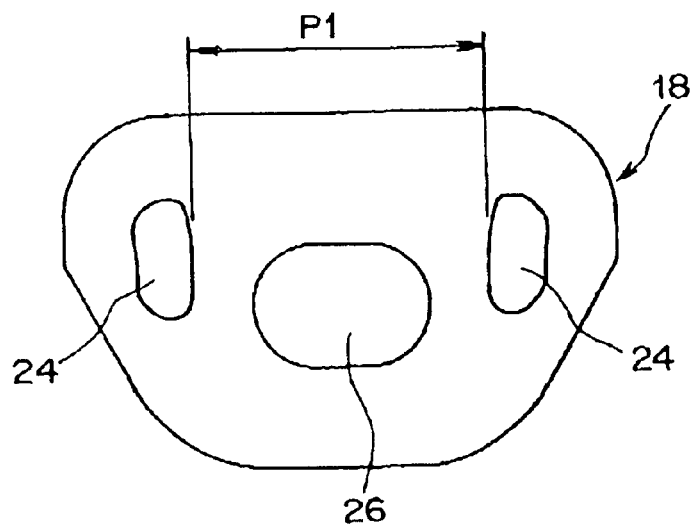
FIG. 3 is an enlarged front elevational view of a guide plate of the silent chain.

As shown in FIG. 1, the guide plate 18 has a thickness smaller than that of the link plates 20, 22. In the illustrated embodiment, the thickness of the guide plates 18 is almost half the thickness of the link plates 20, 22. The guide plates 20, as shown in FIG. 3, each have a pair of spaced pin holes 24 and 24, and a central through-hole or aperture 26 disposed substantially centrally between the pin holes 24, 24. Partly due to the smaller thickness than the link plates 20, and partly due to the presence of the aperture 26, the guide plates 18 have smaller rigidity than the link plates 20, 22 and hence are susceptible to deformation when subjected to a force or load acting in the direction of the pitch of the guide plates 18.

The pair of pin holes 24 and 24 are fitted with two adjacent longer pins 16a and 16a, respectively. The pitch P1 of the guide plates 18 is defined by the distance between the pair of pin holes 24, 24 or by the distance between respective rocker surfaces of the adjacent longer pins 16a, 16a.

Figure 4:
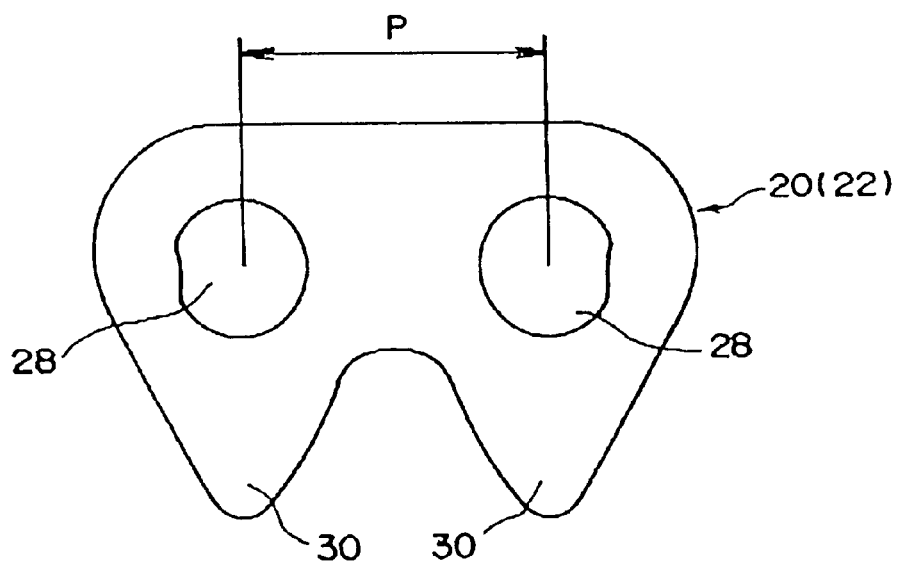
FIG. 4 is an enlarged front elevational view of a link plate of the silent chain.

The link plates 20, 22, as shown in FIG. 4, each have a pair of spaced pin holes 28 and 28, and a pair of teeth 30 and 30. The center-to-center pitch P of the pin holes 28 is a nominal pitch. The pin holes 28 have a partly mutilated circular shape which is mutilated or cut-off at a portion adjacent to an end of the link plate 20. As seen from FIGS. 1 and 2, in the guide link rows 12, the longer pins 16a are seated on the respective mutilated portions of the partly mutilated circular pin holes 28 in the link plates 20. In the joint link rows 14, the shorter pins 16b are seated on the respective mutilated portions of the partly mutilated circular pin holes 28 in the link plates 22.

In each guide link row 12, the distance between a peripheral surface portion of the pin hole 24 in the guide plate 18 which faces the rocker surface of the longer pin 18a, and the mutilated portion of the pin hole 28 in the link plate 20 on which the longer pin 16a is seated is made smaller than the thickness of the longer pin 16a.

The longer pin 16a and the shorter pin 16b that form a single rocker joint pin 16 have the same cross-sectional shape and are initially formed in a straight or rectilinear configuration. The longer pin 16a and the shorter pin 16b are inserted into the pin holes 28 of the link plates 20, 22 and also into the pin holes 24 of the guide plates 18 in such a manner that the respective rocker surfaces of the longer and shorter pins 16a, 16b contact each other. Within the pin holes 28 in the link plates 20, 22, the longer pin 16a and the shorter pin 16b and respective peripheral surfaces of the pin holes 28 jointly define therebetween a space or clearance extending in the longitudinal direction of the pins 16a, 16b.

The silent chain 10 of the present invention may be assembled in the manner described below.

The link plates 20 in the guide link rows 12 and the link plates 22 in the joint link rows 14 are assembled alternately in an interleaved state, and then the longer pins 16a and the shorter pins 16b are inserted in pairs into the respective pin holes 28 in the link plates 20, 22 such that the longer pins 16a project from two outermost link plates 22 in each joint link row 14. In this condition, the longer pins 16a and the shorter pins 16b both have their original straight or rectilinear configuration. Thereafter, the guide plates 18 are fitted with projecting opposite end portions of the longer pins 16a, thus forming a silent chain 10.

The longer pins 16a thus fitted with the guide plates 18 are elastically deformed within the pin holes 28 in the link plates 20, 22 so as to assume an arcuate or bow-like configuration convexly curving toward the mating shorter pins 16b. This is partly because the distance between the peripheral surface portion of the pin hole 24 in the guide plate 18 which faces the rocker surface of the longer pin 18a, and the mutilated portion of the pin hole 28 in the link plate 20 on which the longer pin 16a is seated is made smaller than the thickness of the longer pin 16a, and partly because within the pin holes 28 in the link plates 20, 22, the longer pin 16a and the shorter pin 16b and the respective peripheral surfaces of the pin holes 28 jointly define therebetween a space or clearance extending in the longitudinal direction of the pins 16a, 16b.

Figure 5:
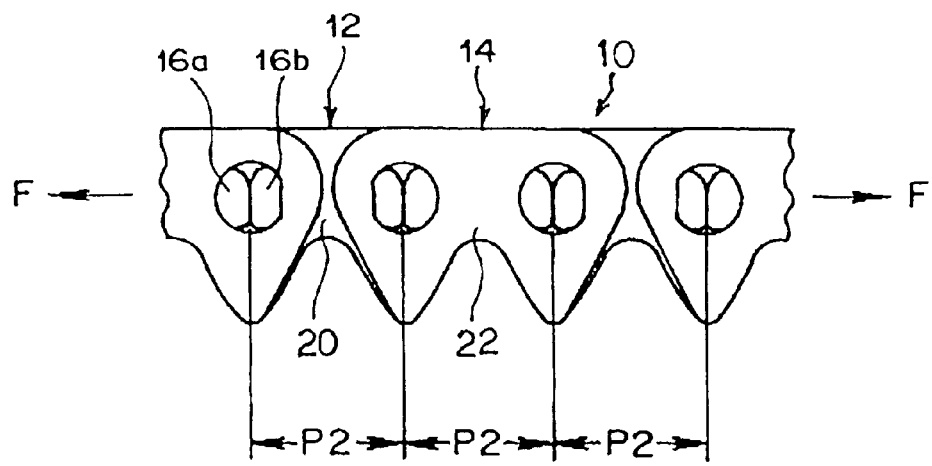
FIG. 5 is a front elevational view of a portion of the silent chain, showing the pitch of the link plates when the silent chain is stretched nearly straight.
Figure 6:
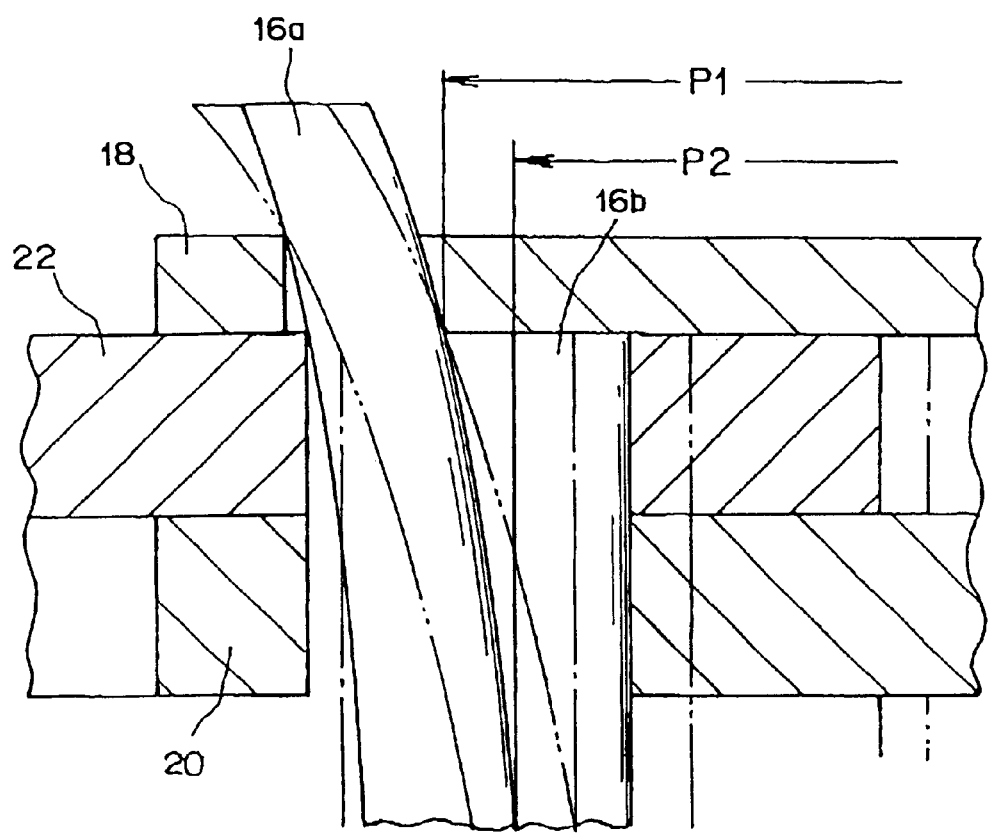
FIG. 6 is an enlarged cross-sectional view showing the manner in which a longer pin of each rocker joint is deformed as the link plate is displaced.

The silent chain 10 is then subjected to a proof load so as to eliminate plastic deformation such as burrs on the link plates 20, 22 and assembling distortion of the silent chain, thereby removing an initial elongation. After that, the silent chain is stretched straight under the effect of a tensile force F (FIG. 5), whereupon each longer pin 16a, which has been elastically deformed or otherwise bowed toward the mating shorter pin 16b, as indicated by the phantom lines shown in FIG. 6, is unbent or made substantially straight at a longitudinal portion thereof inserted through the link plates 20, 22, as indicated by the solid lines shown in FIG. 6. In this instance, the pitch P2 of the link plates 20, 22 is defined by the distance between adjacent contact points between the longer pins 16a and the shorter pins 16b of the rocker joint pins 16.

According to the present invention, when the silent chain 10 is stretched substantially straight after having been subjected to the predetermined proof load, the pitch P1 of the guide plates 18 is made slightly greater than the pitch P2 of the link plates 20, 22. The difference in pitch (P1–P2) between the guide plates 18 and the link plates 20, 22 is preferably in the range of 0.2 to 0.7% of the pitch P2 of the link plates 20, 22.

In FIG. 6, the silent chain 10 as in the state before being subjected to the tensile force F (FIG. 5) is indicated by the phantom lines, and the silent chain as in the state after being subjected to the tensile force F is indicated by the solid lines. The phantom-lined position of the silent chain corresponds to the position shown in FIG. 1. It is to be noted however that the shape of the longer pin 16a is shown in an exaggerated manner.

By thus forming the silent chain 10, even though the straight longer pins 16a are used, they are subsequently assembled in an elastically deformed bow-like configuration. In the assembled condition, since each of the bent longer pins 16a and a mating one of the straight shorter pins 16b define therebetween two symmetric triangular spaces S (FIG. 1) gradually increasing in width from the central portion of the longer pin 16a toward the opposite ends of the longer pin 16a, the rocker joint pin 16 as a whole acquires spring or cushioning properties. Thus, the rocker joint pin 16 is capable of performing a spring action. In many applications, the silent chain 10 is used under a condition in which a predetermined tensile force is applied to the silent chain 10. Accordingly, when the silent chain 10 moves from the slack side disposed on one side of a driving sprocket (not shown) to the tension side disposed on the other side of the driving sprocket, a spring action performed by the rocker joint pins 16 can suppress a noise which may be produced at a collision occurring when the teeth 30 of the link plates 20, 22 mesh with teeth of the driving sprocket. The spring action of the rocker joint pins 16 is also effective to take up a slack in the silent chain.

In a free run of the silent chain 10 extending over the tension side of the driving sprocket, the longer pin 16a and the shorter pin 16b are being in contact with each other over the respective rocker surfaces of the longitudinal portions thereof inserted through the link plates 20, 22, so that the loads on the individual link plates 20, 22 can be distributed evenly. In addition, since the pitch P1 of the guide plates 18 is made slightly greater than the pitch P2 of the link plates 20, 22, the load acting on the guide plates 18 varies with the magnitude of a tension in the stretched silent chain 10.

At the initial stage of the stretched condition, the guide plates 18 are subjected to a compressive force produced by the resiliency of the longer pins 16a being bent elastically, and in the guide link rows 12, the chain tension is exclusively borne by the link plates 20. As the chain tension increases, the inner link plates 20 undergo elastic deformation and thus create an elongated in the longitudinal direction of the chain 10 so that the pitch P2 of the link plates 20, 22 becomes equal to the pitch P1 of the guide plates 18. As the chain tension further increases, the guide plates 18 start to bear the chain tension in cooperation with the link plates 20, 22.

From this point of view, the pitch P1 of the guide plates 18 and the pitch P2 of the link plates 20, 22 are determined such that the difference between these pitches P1 and P2 is less than the amount of elastic deformation of the link plates 20, 22 in the longitudinal direction of the silent chain 10. More concretely, the pitch P1 of the guide plates 18 is preferably set to be 0.2% to 0.7% greater than the pitch P2 of the link plates 20, 22.

The silent chain 10 according to the present invention has various advantages, as described below.

The longer pins initially formed in a straight configuration are caused to elastically bend or bow toward the companion shorter pins due to the difference in pitch between the guide plates and the link plates. By thus deforming the longer pins, the rocker joint pins acquire spring or cushioning properties. Accordingly, by way of elastic deformation of the longer pins, it is possible to take up impact forces acting on the silent chain and suppress the operation noise of the silent chain. Especially, because the longer pins initially formed in a straight configuration are elastically deformed into a bow-like configuration when they are fitted with the guide plates in subsequent to insertion of the longer pins and the shorter pins through the link plates in the guide and joint link rows, assembling of the rocker joint pins relative to the link plates and guide plates can be achieved easily, resulting in an increase in the productivity of the silent chain.

In an application to an automobile engine or an automobile transmission, the silent chain can take up or absorb shock or impact force through elastic deformation of the longer pins occurring when the silent chain moves from the slack side on one side of a driving sprocket to the tension side on the other side of the driving sprocket. In addition, on the slack side, a spring action performed by the longer pins effectively takes up a slack in the silent chain to thereby eliminate the occurrence of vibration. Thus the noise can be reduced on both the tension side and the slack side of the silent chain.

Furthermore, by positively deforming the longer pins into a bow-like configuration, a compressive pre-load is applied from the deformed longer pin to the guide plates. Thus, the chain tension is borne exclusively by the link plates as long as the chain tension is small. As the chain tension increases, the link plates undergo elastic deformation and thus creates an elongation whereupon the chain tension is partly borne by the guide plates. The guide plates thus serve as auxiliary plates which assist the link plates in bearing the chain tension. Since the load to be borne by the guide plates can be reduced, it is possible to protect the guide plates against a breakage and improve the strength of the silent chain.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain comprising:
   guide link rows each having a pair of guide plates and at least one link plate disposed between said guide plates;
   joint link rows each having link plates numbering one more than the number of the link plates in each of the guide link rows; and rocker joint pins connecting said guide link rows and said joint link rows alternately, each joint link row being connected by rocker joint pins to two guide link rows, each guide link row being connected by rocker joint pins to two joint link rows, and the silent chain forming an endless loop, each of said rocker joint pins being composed of a longer pin and a shorter pin having a length smaller than the length of said longer pin, said longer pin being fitted in each of a pair of pin holes formed in each of said guide plates and also being inserted through each of a pair of pin holes formed in each of said link plates, said shorter pin being inserted through each of said pair of pin holes formed in each said link plate, said longer pin and said shorter pin being initially formed in a straight configuration and having respective rocker surfaces contacting with each other, and wherein, after the chain has been subjected to a proof load, in each guide link row of the chain, the pitch of each of the guide plates of said guide link row is 0.2% to 0.7% greater than the pitch of adjacent contact points between the longer pins and the shorter pins of the rocker joint pins in said guide link row, said pitches being determined in portions of the silent chain stretched to a substantially straight condition, whereby, as a result of the difference between the pitch of the guide plates, and the pitch of said adjacent contact points between the longer and shorter pins, said longer pins, which are initially formed in said straight configuration, are elastically deformed into a bow-like configuration bent toward the mating shorter pins.

2. A silent chain according to claim 1, wherein said guide plates are normally subjected to a compressive force applied from the elastically deformed longer pins.

3. A silent chain according to claim 2, wherein said guide plates further have a central aperture formed between said pair of pin holes and are susceptible to deformation as compared to said link plates when subjected to a load applied in the longitudinal direction of the silent chain.

* * * * *